Aug. 16, 1927.

J. AGRILLO ET AL 1,639,207

VEHICLE WHEEL TIRE

Filed Jan. 18, 1927

INVENTORS
John Agrillo
Joseph Daly
John A. Naismith
ATTORNEY

Patented Aug. 16, 1927.

1,639,207

UNITED STATES PATENT OFFICE.

JOHN AGRILLO AND JOSEPH DALY, OF SAN JOSE, CALIFORNIA.

VEHICLE-WHEEL TIRE.

Application filed January 18, 1927. Serial No. 161,826.

One object of our invention is to provide a highly efficient mechanical substitute for air in hollow resilient tires.

It is also an object of the invention to provide a structure of the character indicated that may be quickly assembled independently of the tire and inserted bodily therein.

It is a further object of the invention to provide a device of the character indicated that will be economical in construction, simple in form, and highly efficient in its practical application.

Figure 1:
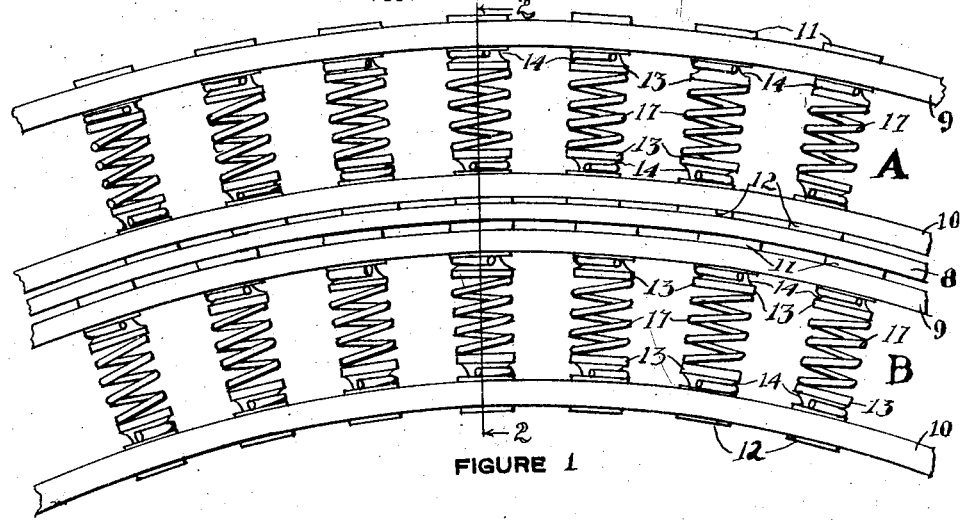
Figure 1 is a side elevation of a portion of the device as arranged for insertion in a tire.
Figure 2:
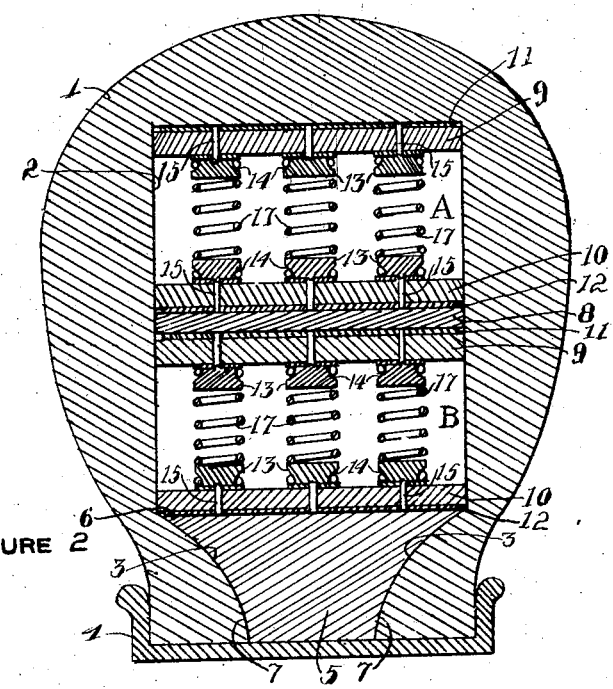
Figure 2 is a sectional view on line 2—2 of Figure 1 showing said portion inserted in a tire mounted on a rim.
Figure 3:
Figure 3 is an elevation of one of the spring supporting buttons.
Figure 4:
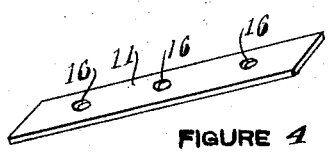
Figure 4 is a perspective view of one of the supporting plates.

Referring more particularly to the drawing, we show at 1 a vulcanized rubber tire, the interior of which is rectangular in transverse cross-section as at 2 with rounded corners as at 3. The tire is fitted upon a rim as 4 in any suitable manner.

At 5 is shown an annular rubber ring having a transversely flat outer perimeter as 6 and concave side portions as at 7 to engage the parts 3 of the tire.

In constructing the preferred form of the invention we provide two similar structures designated in general by the reference characters "A" and "B" separated by a heavy rubber band 8. The structure "A" has an outer diameter substantially equal to the outer diameter of the tire chamber, and the structure "B" has an inner diameter substantially equal to the outer diameter of the ring 5, so that when assembled as shown with the ring or band 8 inserted between the two structures the whole completely fills the tire chamber.

Each of the structures "A" and "B" is built up in the following manner. At 9 and 10 are two spaced and concentrically arranged bands of heavy leather having a width substantially equal to the width of the tire chamber. Arranged crosswise of the band 9 and on the outer surface thereof and in spaced relation to each other, are a plurality of plates 11. Similarly arranged on the inner surface of the band 10 are a plurality of plates 12.

At 13 we show a plurality of buttons having basal surfaces of reduced diameter as at 14, and each button having a pin 15 projecting outwardly from the last mentioned surface to engage an orifice as 16 in a plate 11.

In assembling the structure, the bands 9 and 10 are first fitted with the plates 11 and 12 in the position described, the buttons 13 on the two bands being arranged in opposed relation to each other and their pins 15 passing through the band on which they are placed and engaging the orifices 16 in their respective plates. When in position the pins are riveted whereby to form the band, buttons and plates in one integral whole.

When the two bands are fitted as above set forth and arranged in concentric relation to each other, a spring 17 is slipped on to each pair of opposing buttons as shown, thereby making the unitary structures "A" and "B".

In completing the assembly, the part "A" is first placed in position in the tire and then the band 8 is put in place, this being followed by the part "B" and then the ring 5. When the assembled tire structure is placed in position on a rim it is ready for use.

By means of this construction a wide bearing surface is secured the full width of the wheel rim, and the spring resistance is uniform throughout the whole width. Furthermore, by means of this construction a large number of springs may be economically disposed about the circumference of the tube thereby satisfactorily distributing the stresses and strains to which a tire is naturally subjected.

The construction is economical because besides the bands of slightly different diameter there are only two other elements of different form, namely the buttons and the plates, which require special manufacture.

It is to be understood, of course, that while we have herein shown and described but one specific embodiment of the invention, changes in form, construction, and method of assembly and operation may be made within the scope of the appended claims.

We claim:

1. In a structure of the character described, a pair of spaced and concentrically arranged flexible bands, a plurality of spaced plates positioned on the outer surface of one band and the inner surface of the other and extending crosswise thereof, a plurality of pairs of opposed buttons mounted on the opposing surfaces of said bands and provided with pins extending through said bands and riveted to said plates, and a helical spring engaging each pair of opposed buttons.

2. In a structure of the character described, a casing provided with an annular chamber rectangular in transverse cross-section, a pair of annular resilient structures mounted therein with a flexible band positioned between the same, each structure comprising a pair of spaced and concentrically arranged flexible bands, a plurality of pairs of opposed buttons mounted on the opposing surfaces of said bands, and a helical spring connecting each pair of opposed buttons.

JOHN AGRILLO.
JOSEPH DALY.